Inventor:
Henry E. Warren,
by Albert G. Davis
His Attorney

Patented Oct. 7, 1924.

1,511,071

UNITED STATES PATENT OFFICE.

HENRY E. WARREN, OF ASHLAND, MASSACHUSETTS, ASSIGNOR TO WARREN CLOCK COMPANY, A CORPORATION OF MAINE.

SELF-STARTING SYNCHRONOUS MOTOR.

Application filed June 14, 1922. Serial No. 568,203.

*To all whom it may concern:*

Be it known that I, HENRY E. WARREN, a citizen of the United States, residing at Ashland, in the county of Middlesex, State of Massachusetts, have invented certain new and useful Improvements in Self-Starting Synchronous Motors, of which the following is a specification.

My invention relates to self-starting synchronous motors for use on alternating current systems, and has for its object to provide improvements in motors of the character described in United States Letters Patent No. 1,390,320, issued to me September 13, 1921, and assigned to the same assignee as the present invention.

The above patent describes a self-starting synchronous motor having separate elements for accomplishing the starting and synchronous operations.

Figure 1:
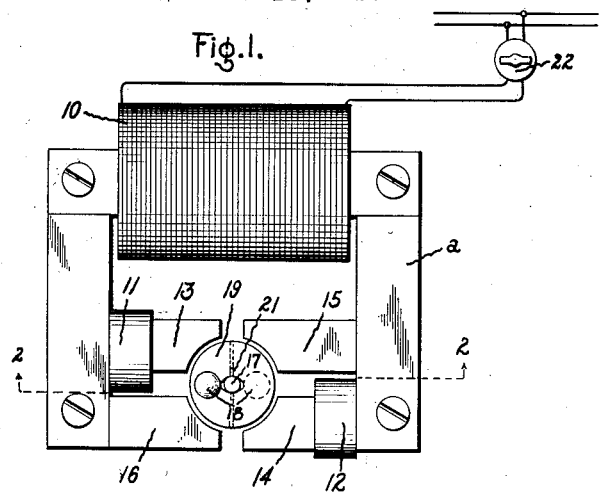

The motor of the present invention is provided with a starting member and a synchronizing member combined into one element. The synchronizing member is inactive when the rotor is stationary, but automatically rendered active by centrifugal force, as will be described in connection with the accompanying drawing in which Fig. 1 is a plan of a self-starting synchronous motor embodying this invention, and Fig. 2 a section on line 2—2, Fig. 1 showing the rotor in full. The features of my invention which I believe to be novel and patentable will be pointed out in the appended claims.

Referring to the drawing, "$a$" represents one form of bipolar field magnet constituting the stator of the motor and provided with an energizing coil 10, shading coils 11, 12 for the purpose of causing a time lag of the magnet flux in pole pieces 13 and 14 behind that in the pole pieces 15 and 16 so as to produce a rotating magnetic field about the shaft 17.

Upon the shaft 17 is mounted a rotor consisting preferably of a thin flat disc or ring 19 of hardened steel, or other magnetic material capable of being permanently magnetized to some extent, and which is loaded with diametrically opposite weights 18 of similar material placed on opposite sides of the disc. These weights are shown as being conical in form, but it is not my desire to limit myself to this particular form, nor to two weights as a single weight on one side of the disc would perform the same function.

The disc 19 has an elliptical opening about the shaft and is pivoted thereto, such as by a pin 21, for the purpose of permitting the disc to swing in one direction from a plane at right angles to the shaft. The disc 19 is held by the spring 20 in a plane perpendicular to the axis of rotation when the rotor is at rest, as shown at "A" in Fig. 2. The disc is adapted, when it reaches a certain speed of rotation, to bias itself due to the weights 18, as shown in dotted lines at "B" in Fig. 2, against the action of the spring or like means.

Figure 2:
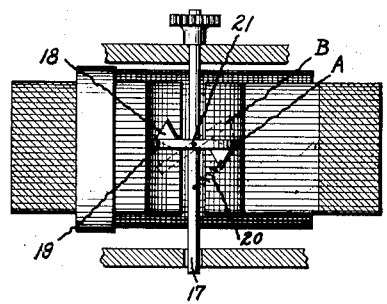

In operation, rotation of the shaft 17 and its rotor member is started by action of the rotating magnetic field on the starting disc 19, which has relatively strong starting characteristics, and as the shaft 17 is rotated the disc is swung about its axis 21 by centrifugal force into its biased position, shown in dotted lines and marked "B," Fig. 2, where it assumes strongly polar, and has strong synchronizing characteristics. The position indicated by the full lines and marked "A" in Fig. 2 may be designated as the starting position in which the disc 19 is substantially non-polar and has a strong starting but minimum synchronizing characteristics. After the polar members 18 have been moved into the running position by the turning of the disc 19 on its axis, the shaft 17 is rapidly brought up to synchronous speed and maintained there with considerable force by the action of polar members 18.

When the circuit is broken between the motor and the source of supply such as by a snap switch 22, the rotor slows down and the disc 19 is turned by the spring 20 from its running position "B" to its starting position "A."

The motor herein shown is especially designed to operate as a bipolar single phase motor, but it is not desired to limit the invention in this respect.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. A self-starting synchronous motor for alternating current comprising means for producing a rotating magnetic field, and a single element rotor which is substantially non-polar when at rest, and strongly polar when in motion, and arranged to be acted upon directly by centrifugal force to transform said rotor from the first condition to the second condition, and means for restoring said rotor to its original position when it stops.

2. A self-starting synchronous motor for alternating current comprising means for producing a rotating magnetic field and a single element rotor having starting and synchronizing characteristics and automatic means for causing the starting characteristic to predominate when the rotor is at rest and for causing the synchronizing characteristic to predominate when the rotor approaches synchronous speed.

3. In a self-starting synchronous motor for alternating current, means for producing a rotating magnetic field, a rotor comprising a thin disc of magnetic material upon which a plurality of diametrically opposite weights are placed on opposite sides thereof, a shaft for supporting said rotor and resilient means between said shaft and rotor, said parts comprising a centrifugal device adapted to be acted upon by centrifugal force to move said rotor into a position where the said diametrically opposite weights give said motor strong polar characteristics.

4. A rotor for a self-starting synchronous motor comprising a shaft, a lop sided hardened steel disc pivotally mounted at its center on said shaft, and means for biasing said disc into a plane perpendicular to said shaft when at rest.

5. In a self starting synchronous motor, means for producing a rotating magnetic field and a single element rotor having a substantially non-polar starting position and a polar synchronizing position, said member being mounted so as to be moved from the starting position to synchronizing position by centrifugal force.

In witness whereof, I have hereunto set my hand this 5th day of June, 1922.

HENRY E. WARREN.